US006502880B1

(12) United States Patent
Sawdon

(10) Patent No.: US 6,502,880 B1
(45) Date of Patent: Jan. 7, 2003

(54) PIN PART LOCATOR

(75) Inventor: Edwin G. Sawdon, St. Clair, MI (US)

(73) Assignee: BTM Corporation, Marysville, MI (US)

( * ) Notice: Subject to any disclaimer, the term of this patent is extended or adjusted under 35 U.S.C. 154(b) by 0 days.

(21) Appl. No.: 09/521,273

(22) Filed: Mar. 8, 2000

(51) Int. Cl.[7] ............................ B25J 19/02; B25J 15/04

(52) U.S. Cl. ..................... 294/88; 294/907; 92/165 PR; 92/177; 901/37

(58) Field of Search ............................ 294/88, 907, 93; 901/37; 91/1; 92/139, 165 PR, 177, 5 R; 269/27, 32, 35

(56) References Cited

U.S. PATENT DOCUMENTS

| | | | | | |
|---|---|---|---|---|---|
| 2,349,253 A | * | 5/1944 | Edmund | ..................... | 267/129 |
| 3,661,053 A | * | 5/1972 | Rich | ........................... | 92/5 R |
| 4,119,017 A | * | 10/1978 | Nusbaumet et al. | .... | 92/165 PR |
| 4,206,455 A | * | 6/1980 | Isakson | ....................... | 92/5 R |
| 4,555,979 A | * | 12/1985 | Cetnarowski | ........... | 92/165 PR |
| 4,736,675 A | * | 4/1988 | Stoll | ...................... | 92/165 PR |
| 4,756,229 A | * | 7/1988 | Drakeley | ..................... | 92/5 R |
| 4,850,102 A | | 7/1989 | Hironada et al. | ............. | 29/787 |
| 4,896,584 A | * | 1/1990 | Stoll et al. | .............. | 92/165 PR |
| 4,987,822 A | * | 1/1991 | Stoll | ........................ | 91/358 R |
| 5,118,088 A | * | 6/1992 | Sawdon | ....................... | 269/32 |
| 5,165,670 A | | 11/1992 | Sawdon | ....................... | 269/32 |
| 5,171,001 A | | 12/1992 | Sawdon | ....................... | 269/32 |
| 5,190,334 A | | 3/1993 | Sawdon | ....................... | 294/88 |
| 5,201,838 A | * | 4/1993 | Roudaut | ..................... | 294/907 |
| 5,308,132 A | * | 5/1994 | Kirby et al. | ................ | 294/907 |
| 5,845,897 A | | 12/1998 | Tunkers | ....................... | 269/32 |
| 5,871,250 A | | 2/1999 | Sawdon | ....................... | 294/88 |
| 6,186,567 B1 | * | 2/2001 | Blick | .......................... | 294/88 |

FOREIGN PATENT DOCUMENTS

| | | | | | |
|---|---|---|---|---|---|
| DE | 2059592 | * | 11/1979 | .................. | 92/5 R |
| DE | 004122481 | * | 1/1993 | .................. | 92/5 R |

OTHER PUBLICATIONS

Tunkers Brochure entitled Stiftziehzylinder, 1 page (believed to be have published Oct. 18, 1997).
BTM Brochure entitled Optional AC & DC Electrical Proximity Switches for BTM Power Clamps, 2 pages (published prior to Mar. 8, 2000).
BTM Brochure entitled Precision Part Locator, 6 pages, published prior to Mar. 8, 2000.
BTM Brochure entitled Power Clamps & Grippers, pp. 8,9,18,24–27,78, published prior to Mar. 8, 2000.
Internet Site for Turck, http://www.turck.com, 17 pages, published Aug. 30, 1999.
Internet Site for Namco Sensors, http://www.inotek.com, 2 pages, published Aug. 30, 1999.

(List continued on next page.)

*Primary Examiner*—Christopher P. Ellis
*Assistant Examiner*—Paul T. Chin
(74) *Attorney, Agent, or Firm*—Harness, Dickey & Pierce, P.L.C.

(57) ABSTRACT

A preferred embodiment of a fluid powered apparatus has a housing, a piston and an off-axis member to deter piston rod rotation relative to the housing. In a further aspect of the present invention, an off-center pin actuates one or more sensors while also deterring rotation of a piston rod relative to a housing. An additional aspect of the present invention provides for complete retention and sealing of a sensor within a housing.

27 Claims, 7 Drawing Sheets

OTHER PUBLICATIONS

BTM Brochure entitled 1500 Series Omni–Head Power Clamps, pp. 2–7, published prior to Mar. 8, 2000.

BTM Brochure entitled Power Clamps & Grippers, pp. 2–23, published prior to Mar. 8, 2000.

BTM Brochure entitled Grippers for High Speed Part Transfer in Press, pp. 2–15, published prior to Mar. 8, 2000.

BTM Brochure entitled Sealed Power Clamps, pp. 1–10, published prior to Mar. 8, 2000.

BTM Brochure entitled Sealed Toggle Clamps, 4 pages, published prior to Mar. 8, 2000.

BTM Brochure entitled Power Grippers and Accessories, 4 pages, published prior to Mar. 8, 2000.

BTM Brochure entitled Power Clamp 1500 Series, 10 pages, published prior to Mar. 8, 2000.

BTM Brochure entitled Optional AC & DC Electrical Proximity Switches for BTM Power Clamps, 2 pages, published prior to Mar. 8, 2000.

Brochure entitled phd Solutions for Factory Automation Grippers, pp. 6–1—6–77; believed to have been published in 1993.

Brochure entitled phd Series GRC Parallel Grippers, pp. 2–20, believed to have been published in 1996.

Brochure entitled phd Series GRD Parallel Grippers, pp. 2–16, believed to have been published in 1996.

Brochure entitled phd Series 190 & 191 Parallel Grippers, 2–16, believed to have been published in 1995.

SMC Corp. drawings entitled "Special Order Cylinder (clamp cylinder)", 3 pages (believed to have been offered for sale in Jul. of 1996).

U.S. Ser. No. 09/426,623 entitled "Locking Pin Clamp" filed on Oct. 26, 1999.

* cited by examiner

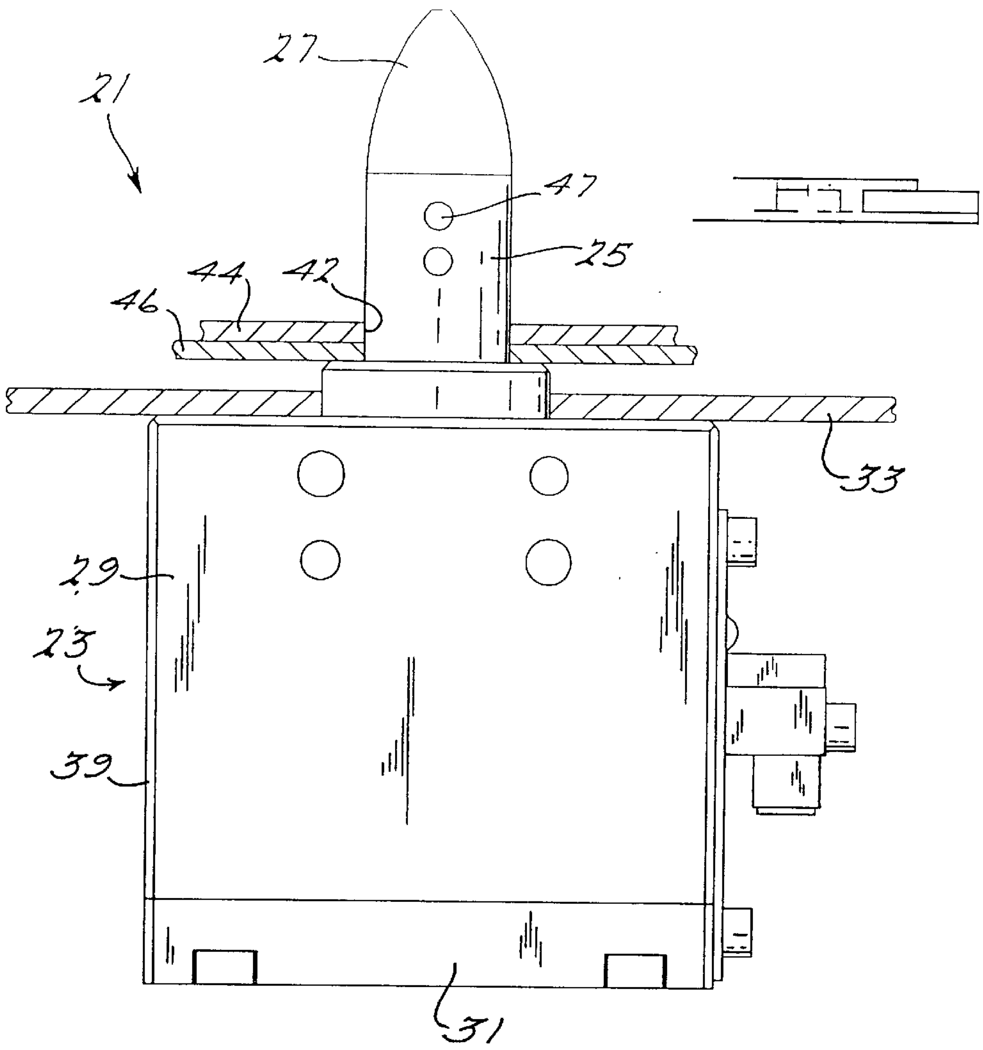
FIG. 1.
FIG. 2.
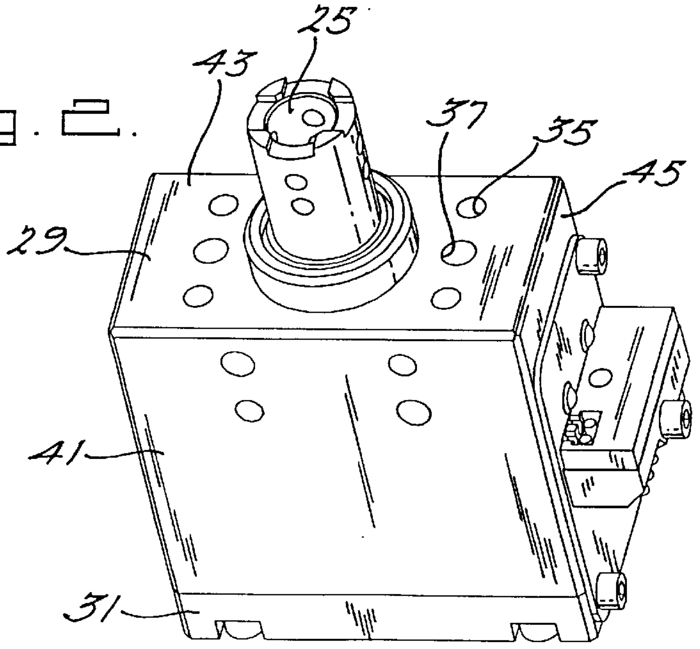

PIN PART LOCATOR

BACKGROUND AND SUMMARY OF THE INVENTION

This invention relates generally to fluid powered devices and more particularly to a fluid powered, part locator.

It is known to employ automatically powered locating pins which are moved from retracted positions to advanced positions to engage and locate workpiece parts on an assembly line or checking station. For example, one conventional pin part locator employs a pneumatically driven piston, having an oval peripheral shape, which advances and retracts an elongated piston rod connected to a tapered workpiece locating pin. However, the tolerances and accuracy of the piston rod and locator pin relative to the body are poor and can vary by as much as plus or minus one-half degree from the desired centerline. This type of inaccuracy is even further accentuated when employed to locate or orient sheet metal panels on an automotive vehicle assembly line when a small tolerance mismatch at the bottom of the vehicle may accumulate to a considerable tolerance stack-up at the vehicle's roof.

It is also known to use proximity switches with pneumatically powered industrial devices such as pin part locators, powered clamps and robotic grippers. For example, reference should be made to U.S. Pat. No. 5,190,334 entitled "Powered Clamp with Parallel Jaws" which issued to Sawdon on Mar. 2, 1993, and U.S. Pat. No. 5,871,250 entitled "Sealed Straight Line Gripper" which also issued to Sawdon on Feb. 16, 1999; these patents are incorporated by reference herein. It is noteworthy, however, that the proximity switches are mounted in optional fluid ports and protrude externally from the devices, thereby requiring additional assembly line clearance.

In accordance with the present invention, a preferred embodiment of a fluid powered apparatus has a housing, a piston and an off-axis member to deter piston rod rotation relative to the housing. In another aspect of the present invention, the member is a finger extending between the piston rod and the piston. In a further aspect of the present invention, the member is an off-center pin aligning the piston and the housing. Still another aspect of the present invention employs an off-center pin projecting from both opposed faces of the piston for removably projecting into opposed holes in the housing on either side of a fluid chamber. In yet a further aspect of the present invention, an off-center pin actuates one or more sensors while also deterring rotation of a piston rod relative to a housing. An additional aspect of the present invention provides for complete retention and sealing of a sensor within a housing.

The apparatus of the present invention is advantageous over conventional devices in that the present invention is significantly more compact and precise. When used with a pin part locator, the compactness allows for reduced component dimensions and closer proximity of the actuating components to the workpiece; this increases precise repeatability and improves tolerance stack-ups within the apparatus. The compactness is enhanced by the multiple functionality of the off-center pin and sensor packaging. Furthermore, the tolerance stack-ups within the apparatus are improved by the multiple anti-rotation features employed as well as positive seating of the piston rod and piston relative to the housing. Additional advantages and features of the present invention will become apparent from the following description and appended claims, taken in conjunction with the accompanying drawings.

BRIEF DESCRIPTION OF THE DRAWINGS

FIG. 1 is a side elevational view showing the preferred embodiment of a pin part locator of the present invention;

FIG. 2 is a perspective view showing the preferred embodiment pin part locator;

DETAILED DESCRIPTION OF THE PREFERRED EMBODIMENT

Figure 3:
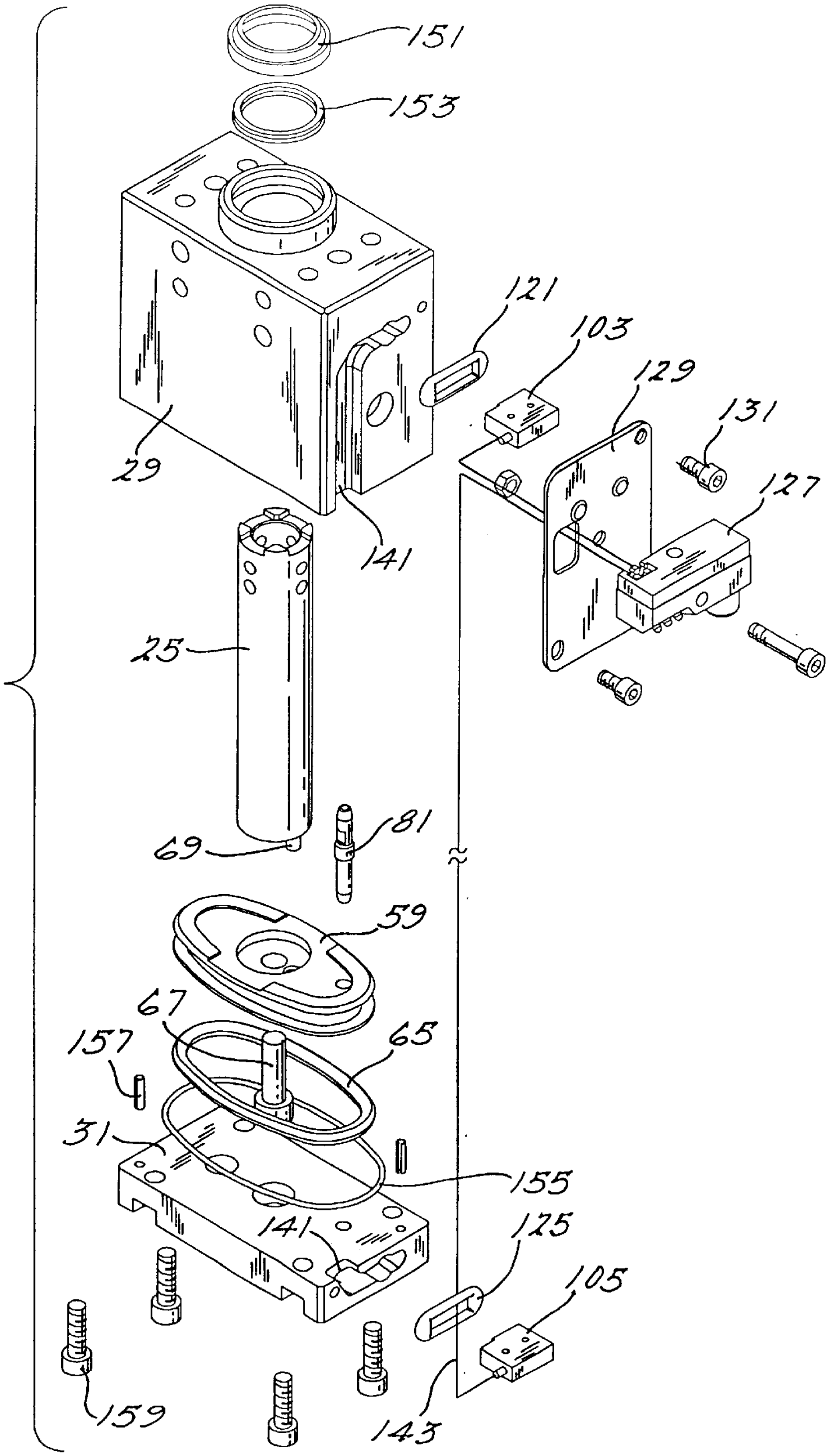
FIG. 3 is an exploded perspective view showing the preferred embodiment pin part locator.
Figure 4:
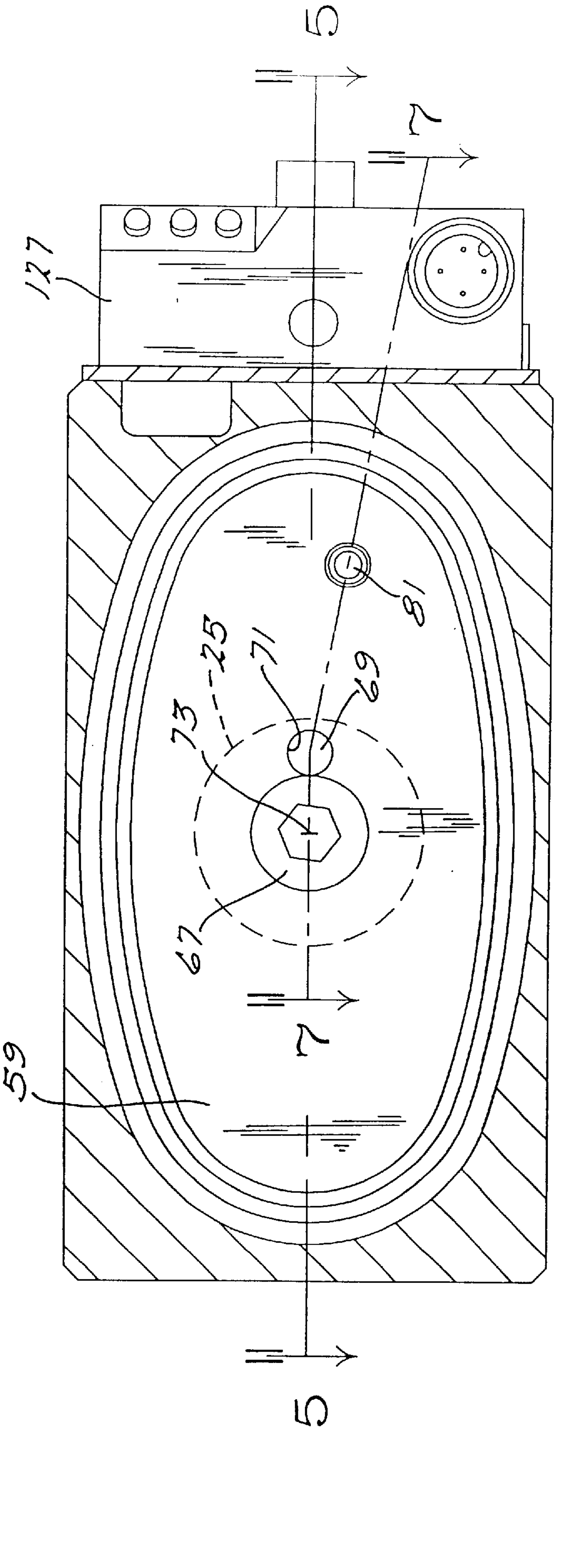
FIG. 4 is a cross sectional view, taken along line 4—4 of FIG. 6, showing the preferred embodiment pin part locator.
Figure 5:
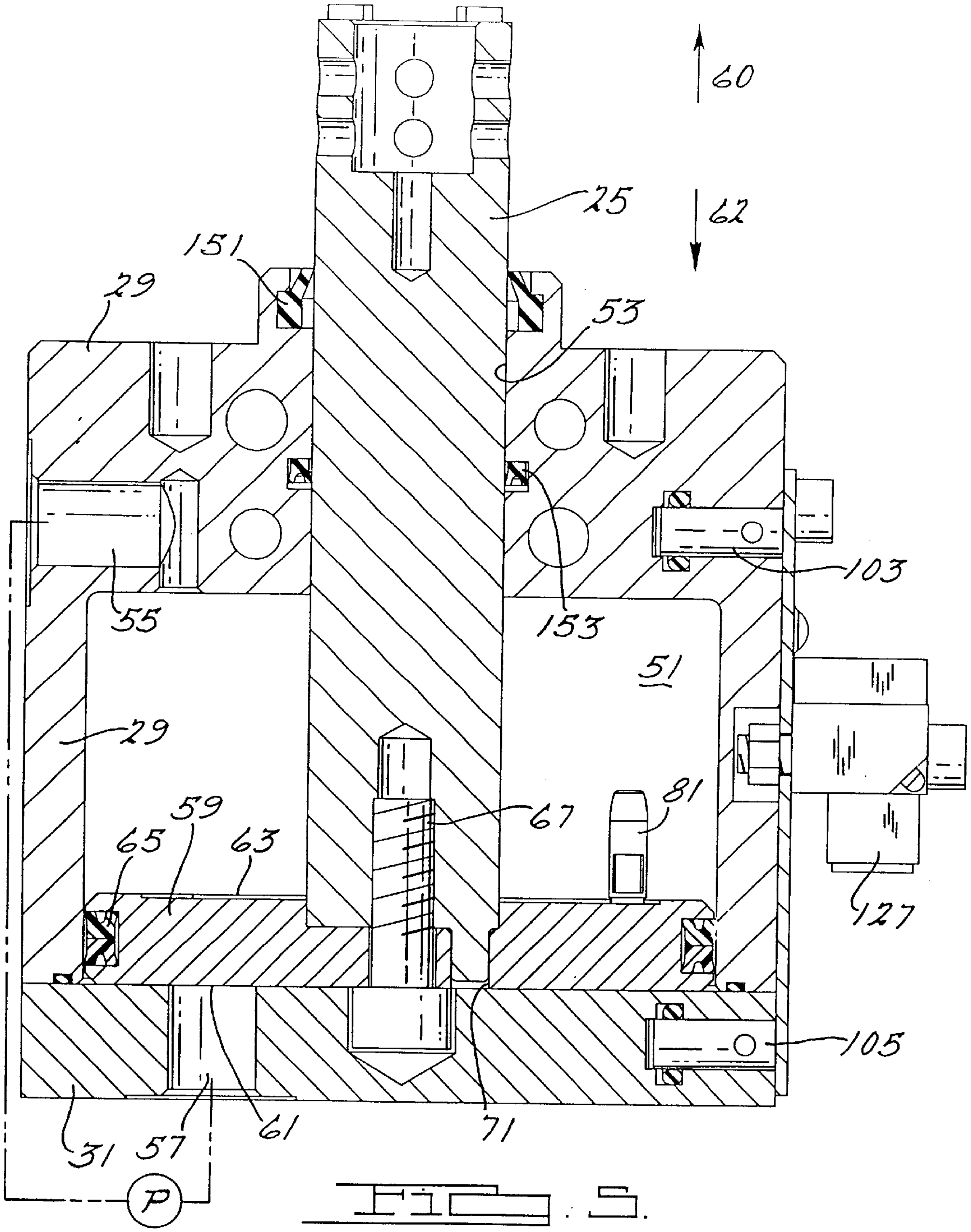
FIG. 5 is a cross sectional view, taken along line 5—5 of FIG. 4, showing the preferred embodiment pin part locator disposed in a retracted position.

The preferred embodiment of a pin part locator 21 is shown in FIGS. 1 and 2. Pin part locator 21 includes a housing 23, a piston rod 25 and a part locator pin 27. Housing 23 further consists of a body 29 and an end cap 31. Body 29 is attached to a bracket 33 secured to a work table, manufacturing plant floor or robot. Multiple bolts secure bracket 33 to holes 35 and dowels serve to orient and prevent rotation of bracket 33 relative to holes 37. It should be appreciated that the rectangular body configuration allows for mounting of pin part locator 21 along any of the external body surfaces such as 39, 41, 43, 45 or the like. Piston rod 25 can be retracted and extended in order to protrude through a pair of openings 42 in multiple sheet metal panels or workpieces 44 and 46. This serves to align these panels about a common gauging point. The arcuately tapered and somewhat conical shape of locating pin 27, enhances entry through the panel openings when the piston rod and locator pin are advanced. Locator pin 27 is secured to a distal end of the piston rod by way of roll pins 47 or the like.

Referring to FIGS. 3–7, body 29 includes an internal fluid chamber 51, a longitudinally elongated bore 53 and fluid ports 55 and 57. A piston 59 is movably located within fluid chamber 51 and piston rod 25 is movably positioned in bore 53. Piston 59 may be moved in a first direction 60 toward workpiece 44 or in a second direction 62 away from workpiece 44. Piston 59 has a pair of opposed and generally flat faces 61 and 63 which are acted upon by the fluid pressure flowing from either port 55 or port 57. Piston 59 further has an oval peripheral shape which is sealed against the oval shaped internal wall of body 29 defining fluid chamber 51. A pair of V-shaped seals 65 are employed.

A cap screw 67 centrally fastens piston 59 to piston rod 25. Furthermore, a circular-cylindrically shaped finger 69 is machined as an integral part of piston rod 25. Finger 69 protrudes from a proximal end of piston rod 25 and engages in a corresponding circular hole 71 of piston 59. Finger 69 is transversely offset from a longitudinal centerline 73 of piston 59 and piston rod 25. Thus, finger 69 and fastener 67 act to significantly deter rotation between piston rod 25 and piston 59. Additionally, the oval shape of piston 59 and the internal body wall defining fluid chamber 51 serve to significantly deter rotation between piston 59 and body 29.

An off-center pin 81 is also attached to piston 59. This can best be observed in FIGS. 4, 7, 12 and 13. Off-center pin 81 has a threaded central segment 83 bordered by a pair of generally cylindrical segments 85 and 87. Frusto-conical leading end segments 89 and 91 are also provided. A pair of opposed wrench receiving flats 93 are employed on one of the cylindrical segments 87. Threaded segment 83 is secured within an internally threaded passage of piston 59. A Lock-tite brand adhesive is then used to further secure off-center pin 81 to piston 59. Cylindrical segments 85 and 87 project from the opposing faces of piston 59 and are oriented with an elongated centerline generally parallel to longitudinal piston centerline 73, but transversely offset therefrom.

Figure 6:
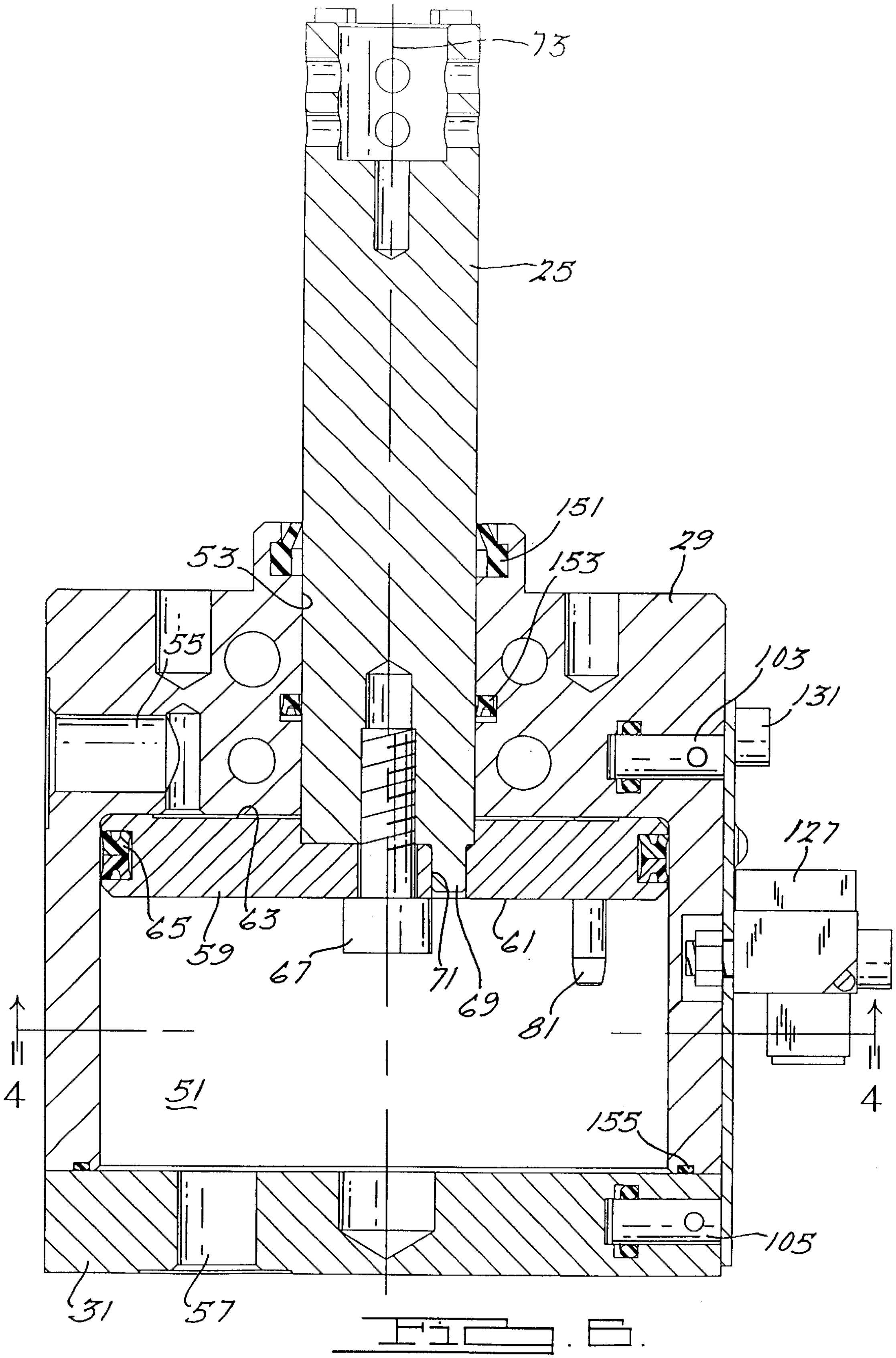
FIG. 6 is a cross sectional view, like that of FIG. 5, showing the preferred embodiment pin part locator disposed in an advanced position.
Figure 7:
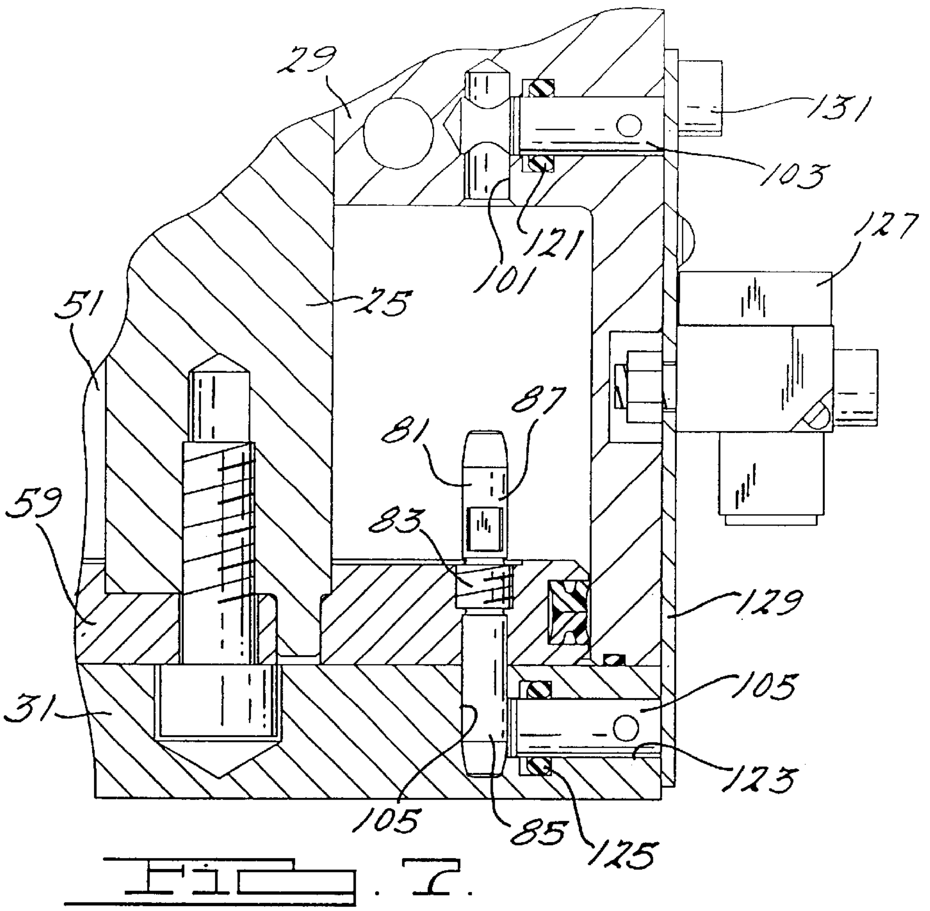
FIG. 7 is a fragmentary cross sectional view, taken along line 7—7 of FIG. 4, showing the preferred embodiment pin part locator disposed in a retracted position.
Figure 8:
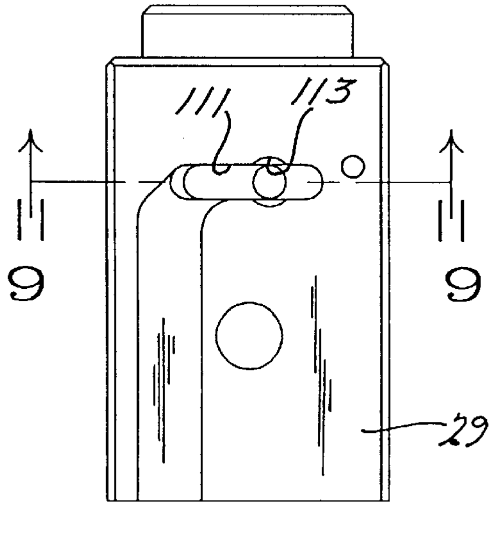
FIG. 8 is a side elevational view showing a body employed with the preferred embodiment pin part locator.
Figure 9:
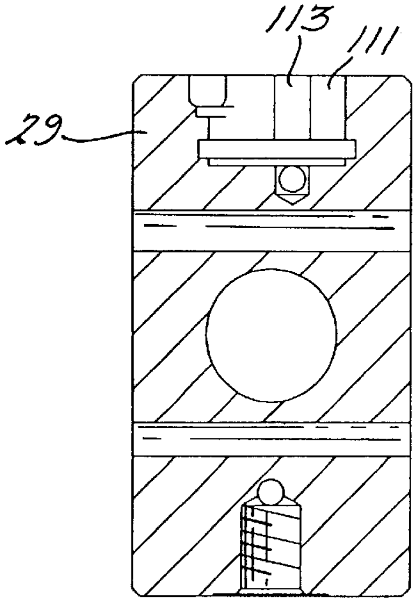
FIG. 9 is a cross sectional view, taken along line 9—9 of FIG. 8, showing the body of the preferred embodiment pin part locator.
Figure 10:
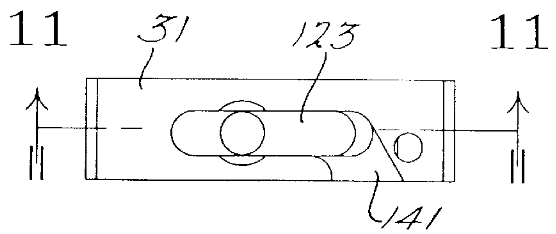
FIG. 10 is a side elevational view showing an end cap employed with the preferred embodiment pin part locator.
Figure 11:
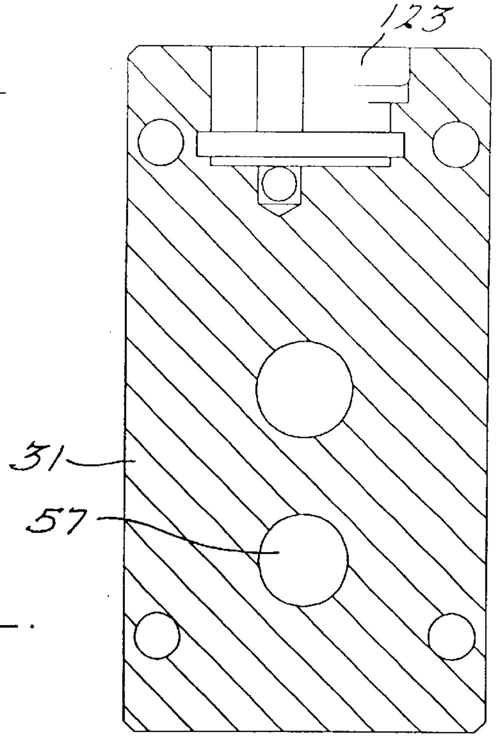
FIG. 11 is a cross sectional view, taken along line 11—11 of FIG. 10, showing the end cap of the preferred embodiment pin part locator.
Figure 12:
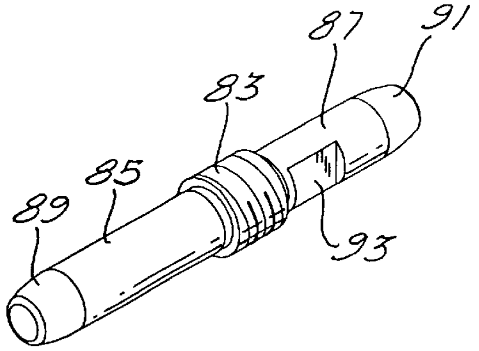
FIG. 12 is a perspective view showing an off-center pin employed with the preferred embodiment pin part locator.
Figure 13:
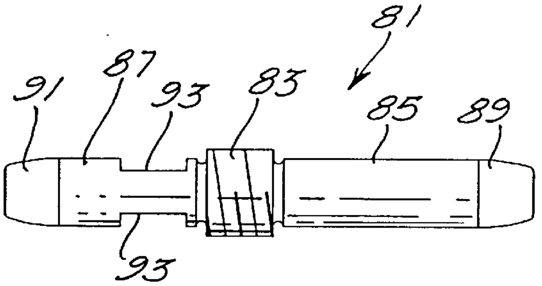
FIG. 13 is a side elevational view showing the off-center pin of the preferred embodiment pin part locator.
Figure 14:
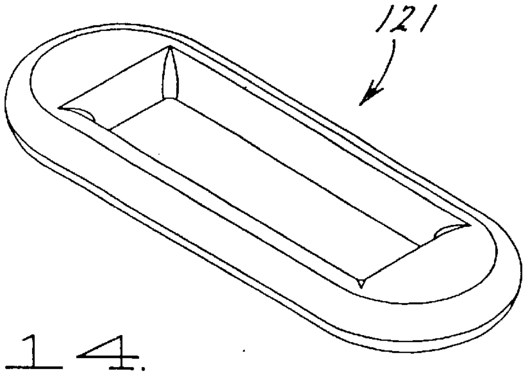
FIG. 14 is a perspective view showing a seal employed with the preferred embodiment pin part locator.

Segment 87 is receivable within an elongated hole 101 (FIG. 7) of body 29 when piston 59 is located in its advanced position, as shown in FIG. 6. This engagement of off-center pin 81 with hole 101 serves the multiple functions of ensuring the accurate positioning of the workpiece locator relative to the body while also actuating a proximity switch sensor 103. Similarly, retracted positioning of piston 59, as shown in FIG. 7, causes off-center pin 81 to enter an opposite hole 105 in end cap 31. This also serves to actuate a second proximity switch sensor 105.

Accordingly, Applicant respectfully requests withdrawal of the objections to the specification.

FIGS. 7–11 illustrate the switch pocket configurations. A switch pocket 111 is machined within body 29 in an elongated direction generally perpendicular to piston centerline 73. Switch pocket 111 has a generally rectangular shape with rounded edges. A rounded opening 113 is also drilled through and past switch pocket 111 to intersect hole 101. This allows communication between switch pocket 111 and fluid chamber 51. Proximity switch 103 entirely fits within pocket 111 such that it is completely disposed below the adjacent nominal exterior surface of body 29. A molded rubber proximity head seal 121, with a generally oval peripheral shape, is located in an undercut area of switch pocket 111. Thus, proximity switch 103 is sealed within switch pocket 111 to prevent fluid from flowing therepast. Proximity switch can preferably be obtained from the Turck Inc.

A similar switch pocket 123 and seal 125 arrangement is provided on end plate 31 for retaining proximity switch 105 and for interfacing with the corresponding segment of off-center pin 81. A dc or ac status controller switch block 127, which can also be obtained from Turck Inc., is bolted to a generally flat, cold rolled sheet metal plate 129 which, in turn, is fastened to the corresponding external surface of body 29 by screws 131. Status controller switch block 127 contains display lights and the appropriate input/output electrical connectors. A depressed channel 141 is machined in body 29 and end cap 31. This can be observed in FIGS. 3 and 10. These channels provide for passage of wires 143 to connect proximity switches 103 and 105 with status controller switch 127 (see FIG. 7). Plate 129 also serves to completely cover and protect proximity switches 103 and 105 as well as wires 143 in channels 141.

Referring again to FIGS. 3–6, a wiper ring 151 and cup seal 153 act in combination with body 29 to provide an enlarged multiple point seat to accurately contact against and position piston rod 25. An O-ring 155 also is used to seal end cap 31 to body 29. A pair of roll pins 157 and four screws 159 secure end cap 31 to body 29. Off-center pin 81 is made of 4150 heat treated steel, piston rod 25 is machined from 6150 chrome-plated steel, while piston 59, end cap 31 and body 29 are all machined from 6061-T651 aluminum stock. The body is further hard coated to provide a hard and durable bearing, so as to eliminate the need for additional inserted bearings.

The pin part locator of the present invention achieves enhanced precision of the piston rod and attached workpiece interface, relative to the desired centerline and housing by way of the offset finger, off-center pin and oval shaped piston. The internal mounting of the proximity switches further enhances compactness of the pin part locator thereby achieving easy packaging and mounting on a busy assembly line and also close spacing of the actuator portion of the locator, such as the piston, relative to the workpiece interfacing portion. The compact design may be machined to interface with other existing pin part locators by simply increasing the body size to suit the mounting area needed. The compact design can offer a flange mount, front face mount, side mount and center key mount. Moreover, the stroke may vary by changing only the rod length, the body length and switch cover; all other components remain standard.

While the preferred embodiment of the pin part locator has been disclosed, it should be appreciated that various other modifications may be made without departing from the present invention. For example, the workpiece interface may be a gripper arm or cam actuated clamp coupled to the piston rod. Furthermore, the body may alternately have a cylindrical shape. While pneumatic fluid is preferred, hydraulic fluid can be employed. Additionally, other piston location sensors can be used in place of proximity switches. It is also envisioned that the finger may project from the piston for engaging in an aperture located in the piston rod. While various materials, shapes and manufacturing processes have been disclosed, it will be appreciated that others can be also employed. It is intended by the following claims to cover these and any other departures from the disclosed embodiments which fall within the true spirit of this invention.

The invention claimed is:

1. A fluid apparatus comprising:

a housing having an internal chamber;

a piston movably located in the chamber;

a piston rod attached to the piston, the piston rod and piston currently being movable along a longitudinal centerline;

a finger extending substantially parallel to and transversely offset from the longitudinal centerline, the finger interconnecting the piston rod and the piston, the finger operably deterring rotation of the piston relative to the housing; and a workpiece interfacing member coupled to the piston rod.

2. The apparatus of claim 1 further comprising a pin mounted to the piston, the pin being transversely offset from the finger and the longitudinal centerline, the pin being elongated in a direction substantially parallel to that of the longitudinal centerline of the piston rod, the pin being receivable within a hole in the housing substantially parallel to and offset from the longitudinal centerline.

3. The apparatus of claim 2 wherein the piston has opposing faces, and the off-center pin projects from both opposing faces.

4. The apparatus of claim 1 wherein the finger is integrally created as a single piece with the piston rod.

5. The apparatus of claim 1 further comprising a threaded fastener attaching the piston rod to the piston, the fastener being coaxially located on the longitudinal centerline, the finger having a smooth and cylindrical external shape.

6. The apparatus of claim 1 wherein the workpiece interfacing member is a tapered locator pin.

7. The apparatus of claim 1 further comprising pneumatic fluid operably advancing and retracting the piston in the chamber, and the finger deterring rotation of the piston rod relative to the piston.

8. A fluid powered apparatus comprising:

a housing having a chamber, a first hole and a second hole;

a piston movable inside the chamber, the piston having a first face and an opposite second face, fluid operably pushing against the first face to cause the piston to advance in a first direction, fluid operably pushing against the second face to cause the piston to retract in a second direction substantially opposite the first direction; and a pin attached to the piston, the pin being offset from the center of the piston, the axis of the pin being substantially parallel to the first direction and protruding from the first and second faces of the piston;

the first hole of the housing being operable to selectively receive the pin when the piston is in an advanced position, and the second hole of the housing being operable to selectively receive the pin when the piston is in a retracted position.

9. The apparatus of claim 8 further comprising:

a first sensor mounted to the housing adjacent to the first hole; and a second sensor mounted to the housing adjacent to the second hole;

the sensors operably sending a signal in response to the sensed location of the pin.

10. The apparatus of claim 9 wherein the sensors are entirely located inside the housing.

11. The apparatus of claim 10 wherein the sensors are proximity switches.

12. The apparatus of claim 8 further comprising:

a piston rod attached to the piston; and a workpiece interfacing member coupled to the piston rod.

13. The apparatus of claim 12 wherein the workpiece interfacing member is a workpiece locator pin having a substantially tapered end.

14. The apparatus of claim 8 further comprising inlet and outlet pneumatic ports located in the housing to allow passage of air fluid into the chamber, and the holes which are operable to receive the pin always being sealed to prevent air from flowing therethrough and outside of the housing when the piston operates.

15. The apparatus of claim 8 wherein the piston has a substantially oval peripheral shape.

16. The apparatus of claim 8 wherein the pin has a pair of substantially cylindrical sections joined by a central threaded section, and the threaded section is affixed to the piston.

17. A fluid powered apparatus comprising:

a housing having a chamber, the housing further having a sensor pocket and a hole connecting the sensor pocket to the chamber;

a piston operably advancing and retracting in the chamber in response to fluid pressure;

a piston rod mounted to the piston;

a member projecting from the piston being operably received inside the hole when the piston is in at least one of an advanced position and a retracted position; and a sensor entirely located in a sealed manner inside the sensor pocket of the housing, the sensor pocket being entirely depressed internal to an adjacent nominal exterior surface of the housing.

18. The apparatus of claim 17 further comprising an elastomeric seal surrounding a portion of the sensor in the pocket.

19. The apparatus of claim 17 further comprising:

a channel located in the external surface of the housing, the channel extending from the sensor pocket;

at least one electric wire connected to the sensor and being positioned in the channel; and a closeout plate attached to the nominal external surface of the housing, the plate substantially covering the sensor and the wire.

20. The apparatus of claim 17 wherein the sensor is a proximity switch operable to determine the presence of the member, the member is an elongated metallic pin projecting from both opposing faces of the piston.

21. The apparatus of claim 17 further comprising a workpiece locating pin attached to the piston rod which is operably advanced and retracted in coordination with fluid powered movement of the piston.

22. The apparatus of claim 17 wherein the sensor has a substantially polygonal external shape.

23. A pin part locator comprising:

a housing having a chamber and a bore connected to the chamber, the housing further having a switch pocket and a hole connecting the switch pocket to the chamber;

a piston operably advancing and retracting in the chamber in response to pneumatic pressure;

a piston rod mounted to the piston, a portion of the piston rod being located in the bore, the piston rod being substantially prevented from rotating relative to the housing;

a member projecting from the piston being removably received inside the hole when the piston is in a first position; and a majority of a switch located inside the switch pocket of the housing, a majority of the switch pocket being internal to an adjacent nominal exterior surface of the housing;

a pneumatic pressure source;

a first port located in the housing being operable to allow pneumatic pressure to flow from the pneumatic pressure source to one end of the chamber; and a second port located in the housing being operable to allow pneumatic pressure to flow from the pneumatic pressure source to an opposite end of the chamber.

24. The locator of claim 23 wherein the member is an elongated pin attached to the piston.

25. The locator claim 24 wherein the pin includes a threaded section and a cylindrical section.

26. The locator of claim 24 wherein the pin projects beyond opposing faces of the piston.

27. The locator of claim 23 wherein the switch is a proximity switch which is sealed inside the switch pocket.

* * * * *

UNITED STATES PATENT AND TRADEMARK OFFICE

CERTIFICATE OF CORRECTION

PATENT NO. : 6,502,880 B1
DATED : January 7, 2003
INVENTOR(S) : Edwin G. Sawdon

It is certified that error appears in the above-identified patent and that said Letters Patent is hereby corrected as shown below:

Title page,
Item [56], References Cited, OTHER PUBLICATIONS,
First entry, "be have" should be -- have been --.
Add -- Internet site for Namco, http://www.midwestequipment.com, 2 pages, published August 30, 1999. --.
Add -- Internet site for Namco, http://www.omnicontrols.com, 3 pages, published August 30, 1999. --.

Column 3,
Lines 38-39, delete "Accordingly, Applicant respectfully requests withdrawl of the objections to the specification."

Column 6,
Line 60, after "locator" insert -- of --.

Signed and Sealed this

Tenth Day of June, 2003

JAMES E. ROGAN
*Director of the United States Patent and Trademark Office*